(12) United States Patent
Leufen et al.

(10) Patent No.: US 7,281,501 B2
(45) Date of Patent: Oct. 16, 2007

(54) MAGNET WHEEL OF AN INTERNAL COMBUSTION ENGINE

(75) Inventors: Heinrich Leufen, Schwaikheim (DE); Rainer Widmann, Schwäbisch Gmünd (DE); Markus Hüsges, Remshalden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 79 days.

(21) Appl. No.: 11/177,637

(22) Filed: Jul. 11, 2005

(65) Prior Publication Data

US 2006/0022540 A1  Feb. 2, 2006

(30) Foreign Application Priority Data

Jul. 28, 2004 (DE) ............... 10 2004 036 548

(51) Int. Cl.
 *F02P 1/02* (2006.01)
(52) U.S. Cl. .................................... 123/41.65
(58) Field of Classification Search ............ 123/41.65, 123/599, 149 D
 See application file for complete search history.

(56) References Cited

U.S. PATENT DOCUMENTS

| | | | | |
|---|---|---|---|---|
| 3,629,632 A | * | 12/1971 | Loupe | 310/74 |
| 3,955,550 A | * | 5/1976 | Carlsson | 123/149 D |
| 4,423,345 A | * | 12/1983 | Nilsson | 310/153 |
| 4,625,849 A | * | 12/1986 | Gommel | 192/105 BA |
| 4,709,669 A | * | 12/1987 | Wissmann et al. | 123/149 D |
| 5,477,841 A | | 12/1995 | Trost et al. | |
| 5,600,195 A | * | 2/1997 | Welborn et al. | 310/153 |
| 6,178,931 B1 | * | 1/2001 | Durr | 123/41.65 |
| 6,192,840 B1 | * | 2/2001 | Durr et al. | 123/41.65 |
| 6,873,073 B2 | | 3/2005 | Iwata et al. | |
| 2001/0037776 A1 | * | 11/2001 | Husges et al. | 123/41.65 |
| 2002/0189560 A1 | * | 12/2002 | Linsbauer et al. | 123/41.65 |

* cited by examiner

*Primary Examiner*—Stephen K. Cronin
*Assistant Examiner*—Jason Benton
(74) *Attorney, Agent, or Firm*—Walter Ottesen (57) ABSTRACT

A magnet wheel (1) for an internal combustion engine, especially a drive motor (2) for a portable handheld work apparatus includes a hub (4) for fixing to a crankshaft (5) of the drive motor (2) and a magnet carrier (6) having at least one magnet holder (7) provided peripherally on the magnet wheel (1). The magnet carrier (6) is a sheet-metal packet (9) of lamella-like layered plates (8). The sheet-metal packet (9) is layered modular-like from at least two differently configured profiled sheet-metal piece types (10, 11, 12). At least one profiled sheet-metal piece type (10) is configured as an arm plate (13) with a hub section (14) as part of the hub (4) as well as an arm section (15) which extends from the hub section (14) radially outwardly up to the region of the magnet carrier (6). At least one additional profiled sheet-metal piece type (11) is configured as a centrifugal mass sheet-metal piece (16) which lies essentially radially outwardly in the peripheral region of the magnet carrier (6).

14 Claims, 7 Drawing Sheets

MAGNET WHEEL OF AN INTERNAL COMBUSTION ENGINE

CROSS REFERENCE TO RELATED APPLICATION

This application claims priority of German patent application no. 10 2004 036 548.2, filed Jul. 28, 2004, the entire content of which is incorporated herein by reference.

FIELD OF THE INVENTION

The invention relates to a magnet wheel of an internal combustion engine including that of a drive motor for a portable handheld work apparatus.

BACKGROUND OF THE INVENTION

In handheld work apparatus such as saw chains, blower/suction apparatus, brushcutters or the like having an internal combustion engine as a drive motor, a magnet wheel is attached to the crankshaft of the drive motor. The magnet wheel includes a magnet carrier of iron wherein at least one magnet is held by means of a magnet holder. The magnet wheel rotates during operation of the engine and the permanent magnet, which is held in the magnet wheel, is guided past an armature having a coil. The armature is fixed to the housing. A voltage is induced in the coil which is used to generate an ignition spark. The magnet carrier is made of iron and is geometrically so adapted that a suitable field-line course adjusts.

A low overall weight is required to facilitate carrying and guiding the work apparatus. The rotating masses should be kept as small as possible, especially for avoiding excessively large spinning forces or spinning torques. At the same time, a high mass moment of inertia of the movable parts is wanted for a quiet running of the engine. These parts act as a flywheel with which the non-uniformities of the running of the engine can be compensated especially in a single-cylinder configuration.

U.S. Pat. No. 5,477,841 discloses a magnetic ignition system of a portable handheld work apparatus wherein an annularly-shaped magnet carrier is mounted in a magnet wheel. Because of the annular shape of the magnet carrier made of iron, its mass lies at a large radius referred to the rotational axis whereby a high rotational moment of inertia results for a low overall weight. The magnet wheel configured in this way is formed of comparatively many individual parts and a separate hub is required.

U.S. Pat. No. 6,873,073 discloses a magnet wheel having a dumbbell-shaped magnet carrier. The magnet carrier is made up of a number of sheet metal pieces which are essentially configured to be identical and are stacked one atop the other to form a sheet metal packet. The sheet metal pieces each have a hub section whereby a hub is integrated into the sheet metal packet while omitting a separate component. In the arrangement shown, a comparatively high mass component is arranged close to the rotation axis which contributes only slightly to the rotational moment of inertia. The magnet wheel configured in this manner has a high inherent mass referred to the total mass moment of inertia.

SUMMARY OF THE INVENTION

It is an object of the invention to provide a magnet wheel of the kind described above which is flexibly adaptable with little complexity to the requirements with respect to mass and rotational inertia.

The magnet wheel of the invention is for an internal combustion engine including a drive motor for a portable handheld work apparatus, the engine having a shaft and the magnet wheel having a periphery, and the magnet wheel includes: a hub for mounting the magnet wheel on the shaft; a magnet carrier having at least one magnet holder provided at the periphery of the magnet wheel; the magnet carrier being configured as a packet of layered lamellar sheet-metal pieces; the packet being of a modular configuration and layered from at least two differently shaped profiled sheet-metal piece types; a first one of the profiled sheet-metal piece types being configured as an arm sheet-metal piece having a hub section defining a portion of the hub and an arm section extending radially outwardly from the hub section up to the region of the magnet carrier; and, a second one of the profiled sheet-metal piece types being configured as a rotating mass sheet-metal piece lying essentially radially outside in the peripheral region of the magnet carrier.

A magnet wheel is proposed whose magnet carrier is configured as a sheet metal packet of lamella-like layered sheet metal pieces. The sheet metal packet is layered modular-like from at least two differently configured profiled sheet-metal piece types. At least one profiled sheet-metal piece type is configured as an arm sheet-metal part having a hub section as part of the hub as well as being configured with an arm section which extends from the hub section radially outwardly up to the region of the magnet carrier. At least one further profiled sheet-metal piece type is configured as a centrifugal mass sheet-metal piece lying essentially radially outside in the peripheral region of the magnet carrier. With the modular-like configuration of the sheet metal packet of various standardized profiled sheet-metal piece types, a variable adaptation of the mass characteristics of the magnet wheel to the particular requirements can be achieved with simple means. A portion of the sheet metal packet is formed by the arm sheet-metal parts into which the hub section is integrated. A separate hub is then unnecessary whereby the configuration of the magnet wheel is simplified. The additional centrifugal mass sheet-metal pieces are concentrated with their respective masses at a large radius relative to the rotational axis whereby a high inertial torque results with low overall weight. The arm sections reach inwardly up to the hub region with only a slight mass component close to the hub. The additional centrifugal mass sheet-metal pieces improve the ratio of rotational mass inertia to total weight. The modular-like configuration permits an adaptation, for example to various work apparatus, by selecting from standardized profiled sheet-metal piece types and modular-like adapted layer configurations.

According to a feature of the invention, the arm sheet-metal piece and the centrifugal mass sheet-metal piece can be configured as one piece. The arm sheet-metal part and the centrifugal mass sheet-metal piece together define the spoked-wheel sheet-metal part. It can be practical that the sheet-metal packet comprises only this one sheet-metal piece type. The arrangement permits an overall light-weight configuration. The one-piece formed-on annular sheet-metal part generates a comparatively high mass inertial moment referred to the total mass.

In an advantageous further embodiment of the invention, the centrifugal mass sheet-metal part is configured as an annular sheet-metal part concentric to the hub and lying in the region of the magnet holder. All mass sections of the annular sheet-metal part lie on a comparatively large rotational radius and contribute to a high mass moment of inertia with low overall weight. When the annular sheet-metal part is embedded in a form material (for example, a form material of injection-molded plastic), the annular sheet-metal part exercises a reinforcing action on the formed part, for example, in the form of a fan wheel.

In a practical alternate embodiment, the centrifugal mass sheet metal is configured in a concentrated sheet-metal piece in the region of the magnet holder. Here too, a mass concentration results in a region having a large rotational radius with the consequence of a high rotational inertia at low overall weight. The arrangement of a concentrated sheet-metal piece can be especially advantageous in connection with a dumbbell-shaped arm sheet-metal part insofar as an annularly-shaped configuration is to be avoided. The course of the magnetic field lines is then concentrated to the region of the magnets or arm sections.

In an advantageous embodiment, a spoked-wheel sheet-metal part is provided wherein the first profiled sheet-metal piece type of the arm sheet-metal part and the second profiled sheet-metal piece type of the annular sheet-metal part are joined as one piece. The advantages of the arm sheet-metal part and that of the annular sheet-metal part are effectively combined. Building upon the spoked-wheel sheet-metal part, a modular-like layered sheet metal packet can be formed wherein additional annular sheet-metal pieces lie compactly against the annular region of the spoked-wheel sheet-metal parts. The additional annular sheet-metal pieces form an effective inertial mass while the arm regions are configured only in a portion of the sheet-metal packet. The component of the sheet-metal parts with corresponding arm regions can be selected so small that the required mechanical characteristics are given and without an excessive mass component coming to lie close to the rotational axis.

In a practical embodiment, the sheet-metal packet comprises a further profiled sheet-metal piece type in the form of a hub annular disc. At least one hub annular disc is mounted radially inwardly as part of the hub. For only a slight number of arm sheet-metal pieces having hub sections, the hub region can be thickened by the hub annular discs with only a slight increase in mass. There results a high carrying capacity of the hub which is adaptable in a modular manner by selecting a corresponding number of hub annular discs.

In a further advantageous embodiment, the sheet-metal packet has conically-stepped hub openings for forming the hub. The hub openings can be punched out in a simple manner to have a circular shape without using special tools. With the selection of a corresponding stack sequence alone, a conical hub shape results for attaching the magnet wheel to a conical shaft seat without a corresponding conical seat having to be machined into the hub region of the sheet-metal packet in a complex follow-on machining operation.

At least one portion of the sheet-metal pieces each advantageously has at least one receptacle opening for forming the magnet holder. One or several magnets can be inserted into the corresponding opening without great complexity wherefrom a form-tight fixation of the magnets results. Additional attachment means are unnecessary.

It can be practical to assign a magnet holder to each arm section. As required, several magnets can be inserted in a distributed manner over the periphery depending upon the number of arm sections. A more uniform voltage supply results because of the arrangement of the magnet groups distributed over the periphery of the arm sections. This is suitable, for example, for operating a control electronic also at low engine rpm. A more rapid response of the ignition electronics is achieved when starting the drive motor. If a high number of magnets is not wanted, individual magnet holders could also alternatively be filled with low cost steel elements whereby an imbalance is avoided. In standardized sheet-metal parts, the filling of magnet holders can take place modular-like in accordance with free selection with a corresponding number of magnets and/or mass elements as substitute.

A form material is advantageously cast about the magnet carrier. There results a shielding of the sheet-metal packet against external influences such as contamination, corrosion or the like. Light metal castings of aluminum, magnesium or the like can be used as form materials. It is practical to select an injection-molded plastic as a form material. The processing temperature of the plastic lies below the Curie temperature of the permanent magnets. The permanent magnets can be inserted into the magnet holder premagnetized in advance of coating. A subsequent magnetization after coating is not required. A loss of the premagnetization because of the effect of heat of the injection molding operation is not a problem.

In an advantageous further embodiment of the invention, a fan wheel for generating a cooling air flow for the engine is formed by the forming material. The form material thereby exercises multiple functions as a holding means for the sheet metal pieces, as a protective casement as well as a fan wheel. An integral component with a low number of parts and reduced manufacturing complexity is formed.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
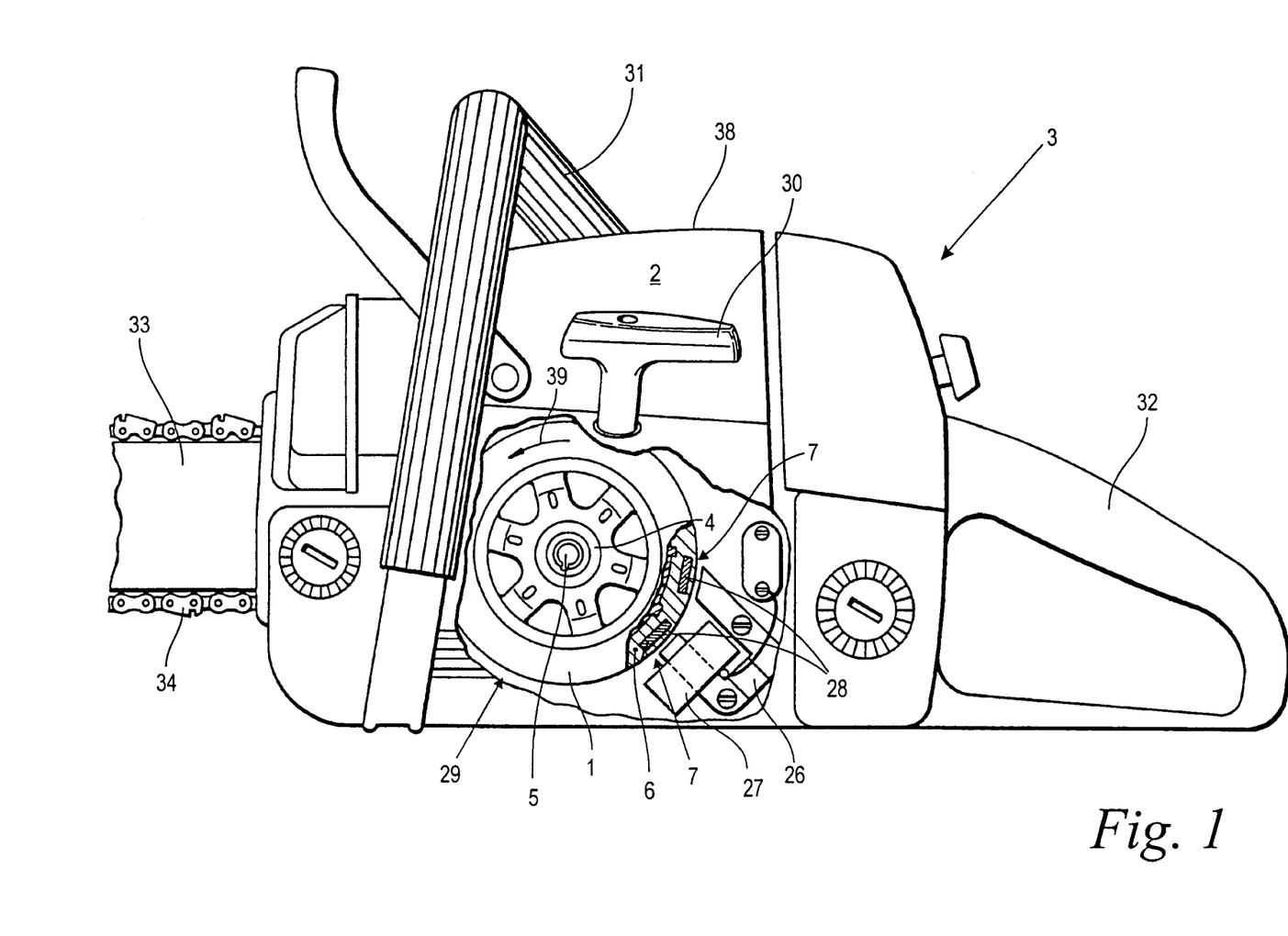
FIG. 1 is a side elevation view of a portable handheld work apparatus in the form of a motor-driven chain saw having a magnet wheel.

FIG. 1 shows a work apparatus 3 in the form of a motor-driven chain saw by way of example. The work apparatus 3 could also be a suction/blower apparatus, a brushcutter or another comparable portable handheld work apparatus.

The work apparatus 3 includes a housing 38 having a forward handle 31 and a rearward handle 32 for carrying and guiding the work apparatus. A guide bar 33, on which a saw chain 34 runs, is shown in the forward region of the work apparatus 3 with only a segment of the guide bar shown. The saw chain 34 is driven by a drive motor 2 (not shown) in the housing 38. The drive motor is configured as a single-cylinder two-stroke internal combustion engine.

The drive motor 2 includes a rotatingly driven crankshaft 5 on which a magnet wheel 1 is attached. The magnet wheel 1 includes a hub 4 with which it is attached to the crankshaft 5 so as to rotate therewith. Part of the magnet wheel 1 is a magnet carrier wherein an arrangement of magnets 28 is held by means of magnet holders 7. The magnet holders 7 and the magnets 28 are arranged to lie radially outside of the magnet wheel 1 and are guided past an armature 26 in a direction of rotation indicated by an arrow 39. The armature 26 is fixed to the housing and has a coil 27 for generating an ignition voltage for the drive motor 2.

A pull-rope starter 30 for starting the drive motor 2 coacts with the magnet wheel 1. The magnet wheel 1 also forms a flywheel 29 for the drive motor 2.

Figures 2, 3:
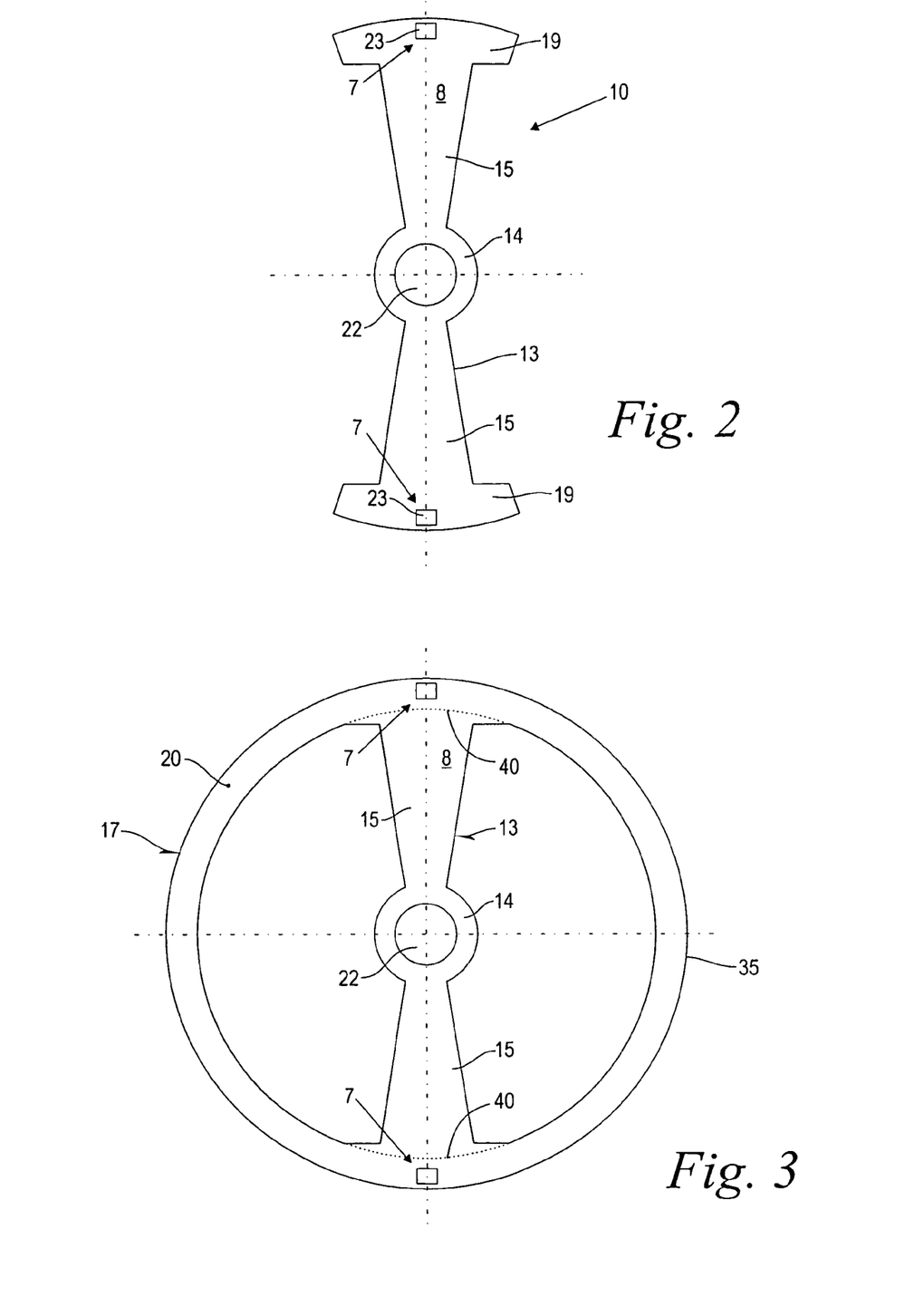
FIG. 2 is a schematic of a dumbbell-shaped arm sheet-metal part.
FIG. 3 is a variation of the arm sheet-metal part of FIG. 2 having an outer-lying annular region.

FIG. 2 shows an embodiment of a first profiled sheet-metal piece type 10 for forming the magnet carrier 6 of FIG. 1. A profiled one-piece thin sheet-metal part 8 is provided which is formed as an arm sheet-metal part 13. The arm sheet-metal part 13 includes a radial inner hub section 14 having a center hub opening 22 as part of the hub 4 of FIG. 1.

Two diametrically opposite-lying arm sections 15 are provided which extend radially outwardly from the hub section 14 to a corresponding radial outer-lying pole section 19. As an example, a magnet holder 7 is assigned to each of the two arm sections 15. The magnet holders 7 are arranged close to the outer contour of the arm sheet-metal part 13 in the region of the hammerhead-shaped pole sections 19. An embodiment with only one magnet holder 7 can be practical. In the embodiment shown, the magnet holders 7 are configured as receptacles 23 punched out of the sheet-metal part 8.

FIG. 3 shows an embodiment of a sheet-metal part 8 which is configured as a spoked-wheel sheet-metal part 35. In the spoked-wheel sheet-metal part 35, an arm sheet-metal part 13 of FIG. 2 and an annular sheet-metal part 17 are joined to form one piece. The annular sheet-metal part 17 is described in greater detail below in connection with FIG. 6. The course of the annular sheet-metal part 17 is indicated by the broken lines 40 and this annular sheet-metal part 17 is formed as one piece on the arm sheet-metal part 13. Accordingly, two profiled sheet-metal piece types 10 (FIG. 2) and 11 (FIG. 6) are joined in the spoked-wheel sheet-metal part 35. It can be practical to build up the magnet carrier 6 (FIG. 1) exclusively from like spoked-wheel sheet-metal parts 35 of FIG. 3. A circularly-shaped annular region 20 is arranged radially outside of the arm sections 15 in lieu of the hammerhead-shaped pole sections 19 of FIG. 2. The annular region 20 extends about the hub opening 22 and corresponds to the annular sheet-metal part 17 of FIG. 6. The spoked-wheel sheet-metal part 35 corresponds to the arm sheet-metal part 13 of FIG. 2 with respect to the magnet holders 7 and the hub section 14 with the hub opening 22.

Figure 4:
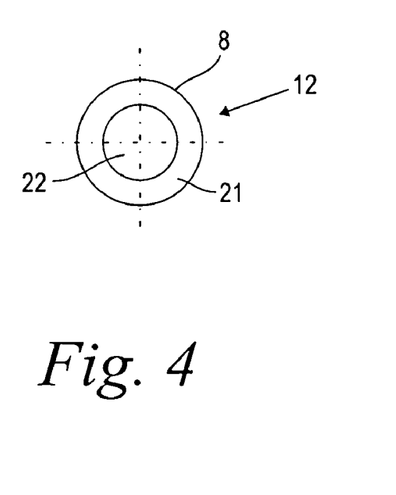
FIG. 4 is a schematic view of a hub annular disc.

FIG. 4 shows an embodiment of a third profiled sheet-metal piece type 12 wherein the sheet-metal part 8 is configured as a hub annular disc 21 having a center hub opening 22. An embodiment of a second profiled sheet-metal piece type 11 is provided in FIG. 5 wherein the sheet-metal part 8 is configured as a centrifugal mass sheet-metal part 16 in the form of a mass concentrated sheet-metal piece 18. The contour of the sheet-metal piece 18 corresponds to the hammerhead-shaped pole section 19 of the arm sheet-metal part 13 of FIG. 2.

Figure 6:
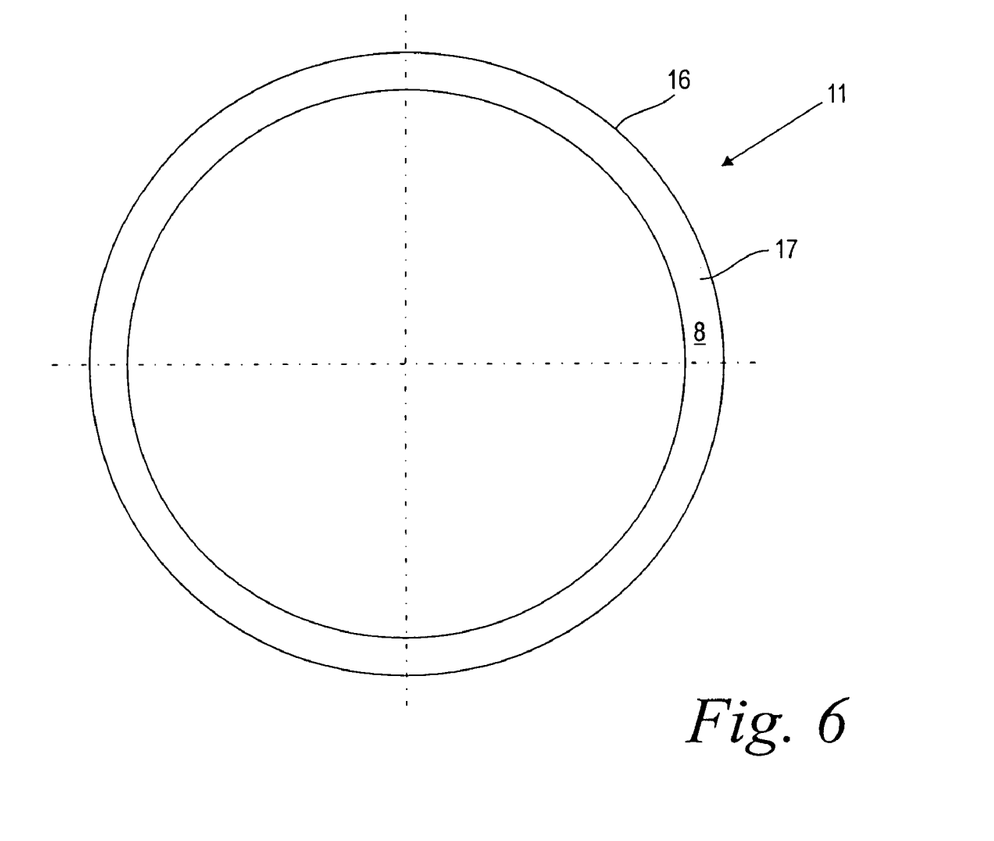
FIG. 6 is a further embodiment of a centrifugal mass sheet-metal part in the form of an annular sheet-metal piece.

FIG. 6 shows a further embodiment of the second profiled sheet-metal piece type 11 wherein the sheet-metal part 8 is configured as a centrifugal mass sheet-metal part 16 in the form of an annular sheet-metal part 17. The annular sheet-metal part 17 is configured as a circular annular disc in the embodiment shown. A non-uniform shaped annular embodiment can, however, also be practical.

Figure 7:
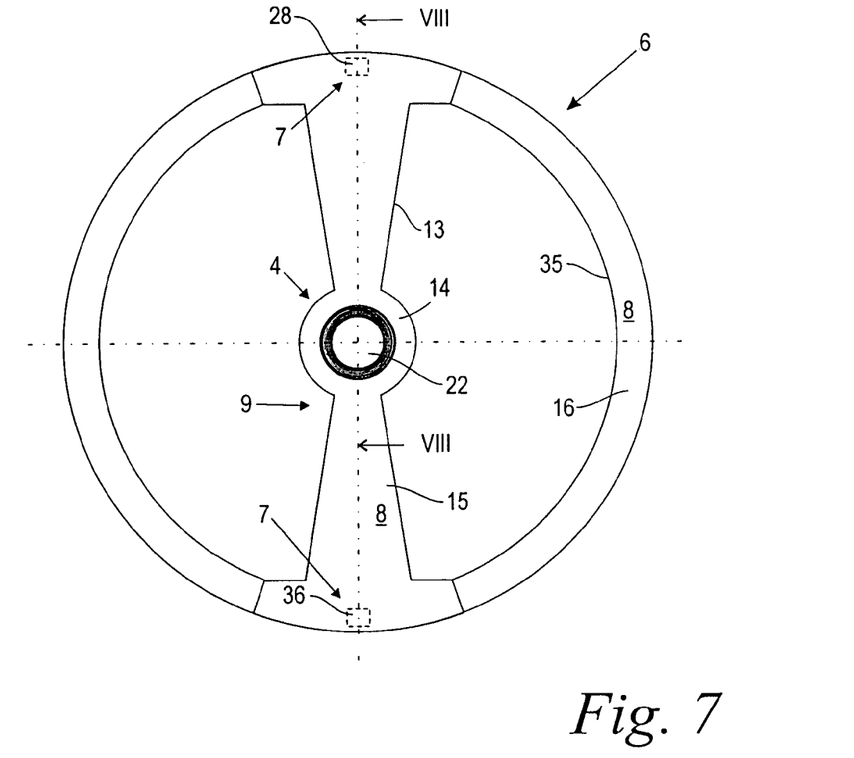
FIG. 7 is a schematic plan view of a modular-like built-up magnet carrier having arm sheet-metal parts and annular parts.

FIG. 7 shows a first embodiment of a magnet carrier 6 for a magnet wheel 1 of FIG. 1. The magnet carrier 6 is configured as a sheet-metal packet 9 of lamella-like layered sheet-metal pieces 8. The sheet-metal packet 9 is layered modular-like from two differently configured profiled sheet-metal piece types (10, 11) of FIGS. 2, 3 and 6.

In upper layers referred to the plane of the drawing, a number of arm sheet-metal parts 13 of FIG. 2 are layered one atop the other. Beneath these, a number of spoked-wheel sheet-metal parts 35 of FIG. 3 lie which combine the first profiled sheet-metal piece type 10 of FIG. 2 and the second profiled sheet-metal piece type 11 of FIG. 6. Therebelow, a further number of arm sheet-metal parts 13 of FIG. 2 are stacked.

The hub sections 14 of the arm sheet-metal parts 13 and of the spoked-wheel sheet-metal parts 35 form the hub 4. The inner hub openings 22 of the individual sheet-metal pieces 8 are configured to be stepped conically in the embodiment shown. Alternatively or additionally, a conical shaping by a mechanical, especially a metal-cutting operation, can be practical. The centrifugal mass sheet-metal part 16, which is formed by the annular region 20 (FIG. 3), lies concentrically to the hub 4 and lies, referred to its mass distribution, essentially radially outside in the peripheral region of the magnet carrier 6. The arm sections 15 extend radially from the hub section 14 outwardly to the region of the magnet holder 7. A magnet 28 indicated in phantom outline is held in the magnet holder 7 while a simple steel element 36 is held in the opposite-lying magnet holder 7 and functions as a mass compensation.

Figure 8:
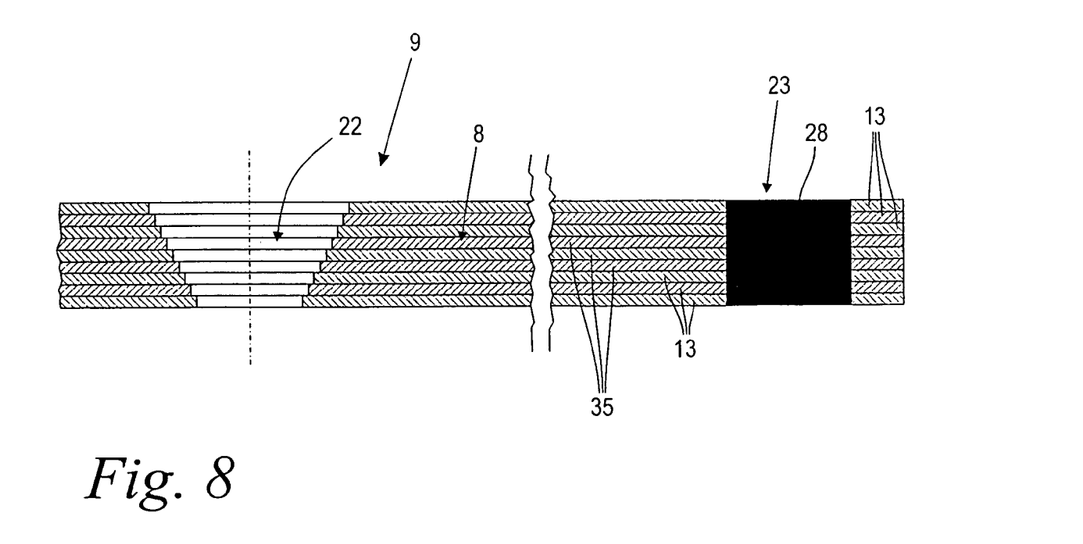
FIG. 8 is a schematic longitudinal section view of the arrangement of FIG. 7 taken along line VIII-VIII thereof.

FIG. 8 shows a cross section view of the arrangement of FIG. 7 along line VIII-VIII thereof. The sheet-metal packet 9 is formed from a number of sheet-metal pieces 8 which are layered lamella-like one atop the other. The section view shows that the individual, centrally punched hub openings 22 are conically stepped with respect to each other in their diameters so that, in total, a conical overall contour of the hub openings 22 results for the attachment to a conical shaft seat on the crankshaft 5 (FIG. 1).

For example, a stacking sequence is selected for forming the sheet-metal packet 9 wherein, essentially, three spoked-wheel sheet-metal parts 35 are enclosed in axial direction on the outside by three arm sheet-metal parts 13 each. The sheet-metal parts 8 each include a receptacle opening 23 in which the magnet 28 or a steel element 36 of FIG. 7 can be held. An unsymmetrical stacking sequence of the sheet metal pieces can also be advantageous.

Figure 9:
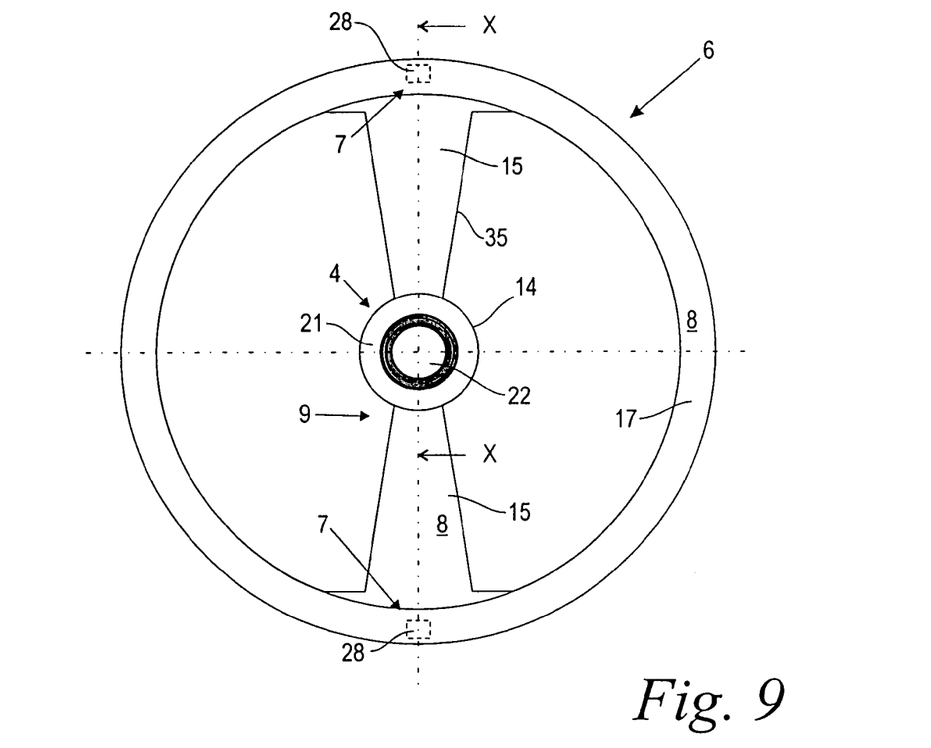
FIG. 9 is a variation of the arrangement of FIG. 7 having a modified sheet metal stacking sequence.

FIG. 9 shows another embodiment of the magnet carrier 6 of FIG. 7. The sheet-metal packet 9 is layered in such a manner that, referred to the stacking direction, spoked-wheel sheet-metal pieces 35 are provided centrally. Radially outward-lying annular sheet-metal pieces 17 as centrifugal mass sheet-metal pieces 16 of FIG. 6 are provided on both sides of the spoked-wheel sheet-metal parts 35. In the region of the hub sections 14, hub annular discs 21 are stacked on both sides of the spoked-wheel sheet-metal parts 35. The hub annular discs 21 and the annular sheet-metal portions 17 are arranged concentrically to the hub opening 22. The hub sections 14 and the hub annular discs 21 conjointly form the hub 4. A magnet holder 7 is assigned to each of the arm sections 15 in correspondence to the embodiment of FIG. 7. In the embodiment shown, a magnet 28 is held in each of the two magnet holders 7.

Figure 10:
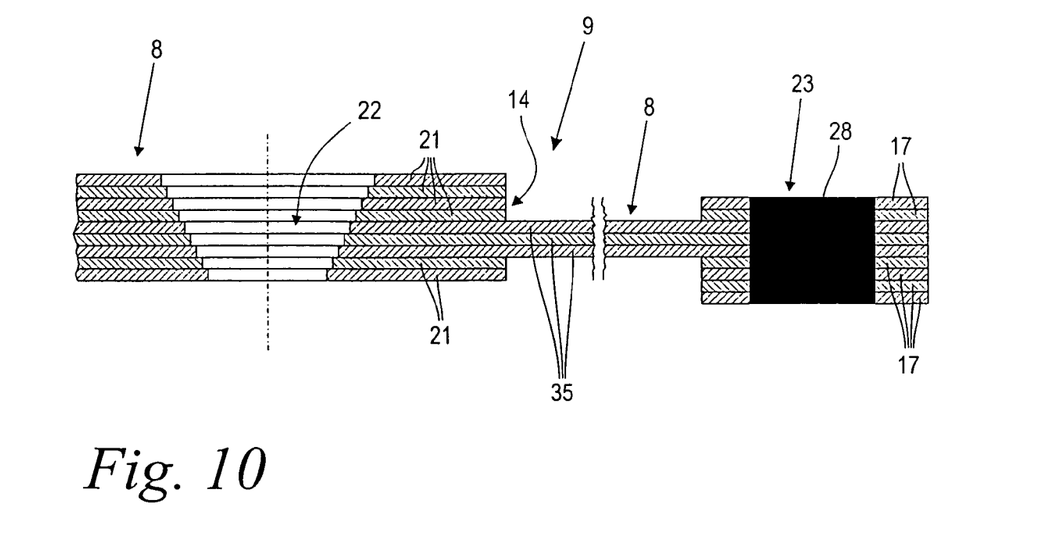
FIG. 10 is a longitudinal section view of the arrangement of FIG. 9 taken along line X-X thereof.

FIG. 10 shows a section view of the arrangement of FIG. 9 along line X-X thereof. FIG. 10 shows the stacking sequence of the sheet-metal packet 9. By way of example, three spoked-wheel sheet-metal parts 35 are provided referred to the stacking direction. Referred to the axial direction, on one side, four hub annular discs 21 are provided on the outer side and two hub annular discs 21 are provided on the opposite-lying side in the region of the hub section 14. The hub openings 22 of the sheet-metal parts 8 are stepped conically.

Referred to the axial direction, four annular sheet-metal pieces 17 are stacked on one side of the spoked-wheel sheet-metal part 35 in the radial outer region. Two annular sheet-metal pieces 17 are arranged on the opposite-lying side. A holder of the magnets 28 corresponding to FIG. 8 results. The schematic illustration of the stacking sequence shows the principle. The number and the stacking sequence of the different sheet-metal parts 8 can be adapted as required. Different symmetrically or non-symmetrically built up stacks can be practical. The stack heights of the hub region and of the arm region and of the annular region can be varied independently of each other.

Figure 11:
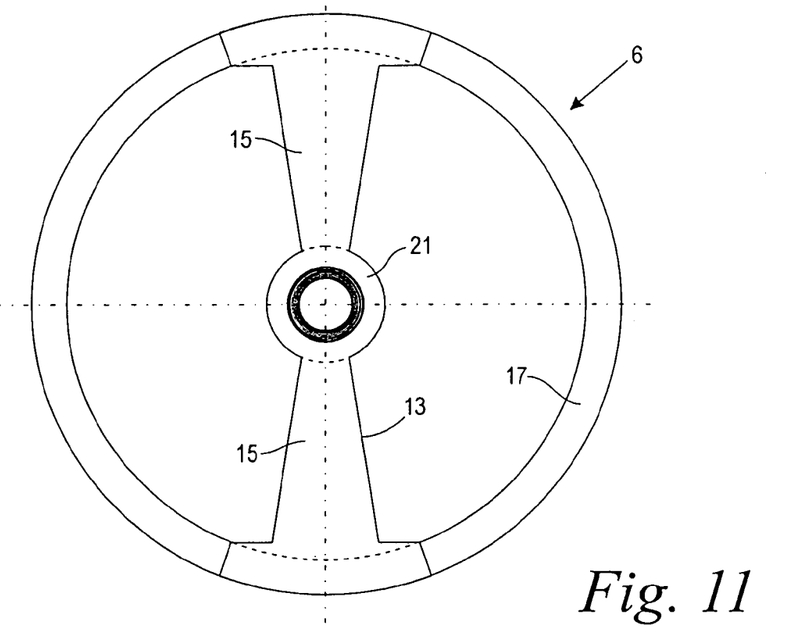
FIG. 11 is a further variation of the arrangement of FIGS. 7 and 9 having arm sheet-metal pieces of FIG. 2, hub annular discs of FIG. 4 and annular sheet-metal pieces of FIG. 6.

FIG. 11 shows a further variation of the magnet carrier 6 wherein center hub annular discs 21 and outer annular sheet-metal pieces 17 are held between arm sheet-metal parts 13. A free space is formed between the arm sections 15 of the arm plates 13. This free space can be filled out, for example, by a form material 24 according to FIG. 13 or by suitable plate pieces.

Figure 12:
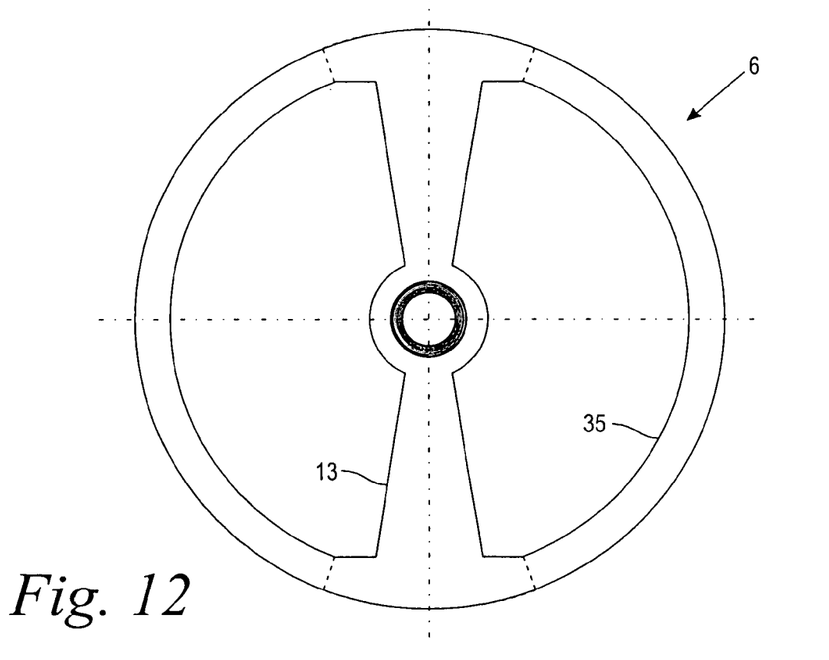
FIG. 12 is an embodiment of the arrangement of FIG. 11 having a modified stacking sequence.

In the embodiment of the magnet carrier 6 of FIG. 12, arm plates 13 are provided by way of example and these arm plates are held between spoked-wheel plates 35.

Figure 13:
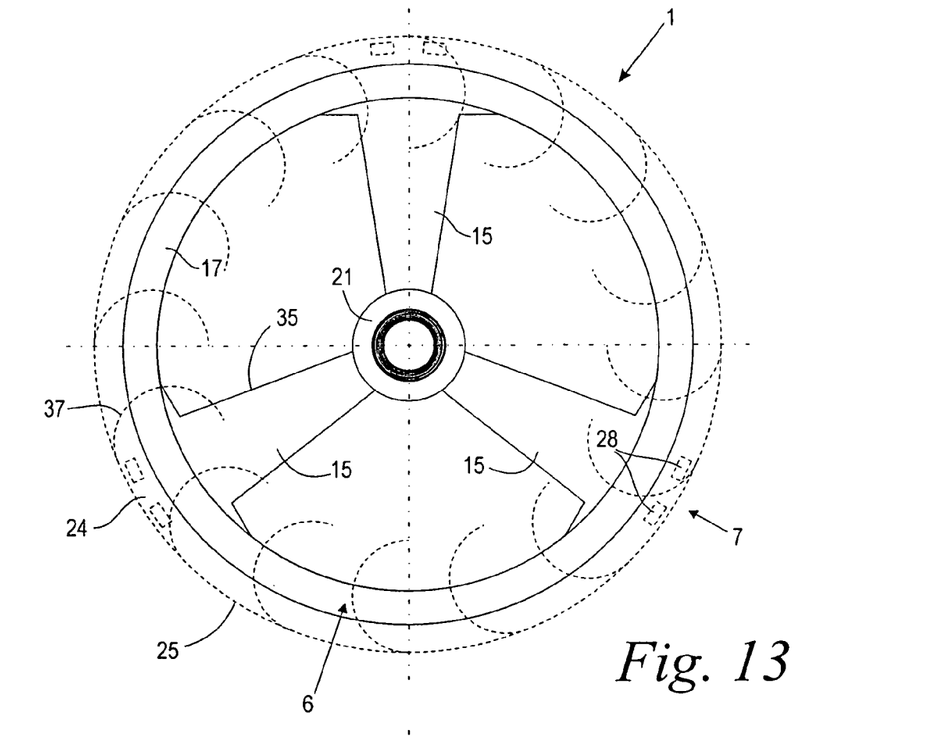
FIG. 13 is a schematic of a magnet wheel in the form of a fan wheel having an integrated magnet carrier and three arm regions; and, FIG. 14 is a further embodiment of a magnet carrier having two arm regions arranged to have a dumbbell shape.

FIG. 13 shows an embodiment of the magnet wheel 1 which is configured as a fan wheel 25. The magnet wheel 1 configured in this manner can be provided in lieu of the magnet wheel 1 of FIG. 1 on the opposite-lying apparatus side. The vanes 37 are indicated in phantom outline and generate a cooling air flow for the drive motor by rotation of the crankshaft 5. A magnet carrier 6 is integrated into the fan wheel 25.

The embodiment of the magnet carrier 6 shown includes a number of spoked-wheel sheet-metal plates 35 on which respective annular plates 17 and hub annular discs 21 are arranged in correspondence to the embodiment of FIGS. 9 and 10. The spoked-wheel plates 35 here each have three arm sections 15 each having a magnet holder 7. A pair of magnets 28 is held in each magnet holder 7. Here as well as in other embodiments, two, three or more arm sections 15 can be practical having a corresponding number of magnet holders 7. In the embodiment shown, the magnet groups are arranged distributed over the periphery at uniform spacings of 3×120°. A non-uniform distribution of, for example, 2×100° and 1×160° can be advantageous. For generating a properly adapted induction course, an alternating polarization is also possible in addition to a uniform polarization of all magnet groups. Likewise, it can be practical to arrange two magnets 28 with mutually opposite polarization within one magnet group.

The magnet carrier 6 is coated with a form material 24 and the fan wheel 25 is formed by the form material 24. The plates 8 of the plate packet 9 (FIG. 10) can be riveted, glued or otherwise connected to each other and are held to each other by means of the form material 24. An injection-molded plastic is selected 32 as form material 24. A light metal casting such as aluminum pressure die casting or magnesium pressure die casting can also be selected.

Figure 5:
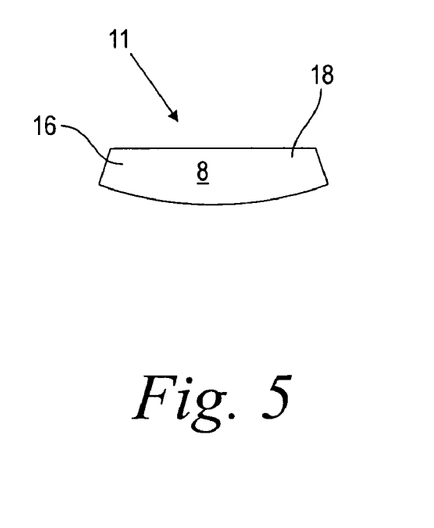
FIG. 5 is a schematic of a centrifugal mass sheet-metal part in the form of a concentrated sheet-metal piece.
Figure 14:
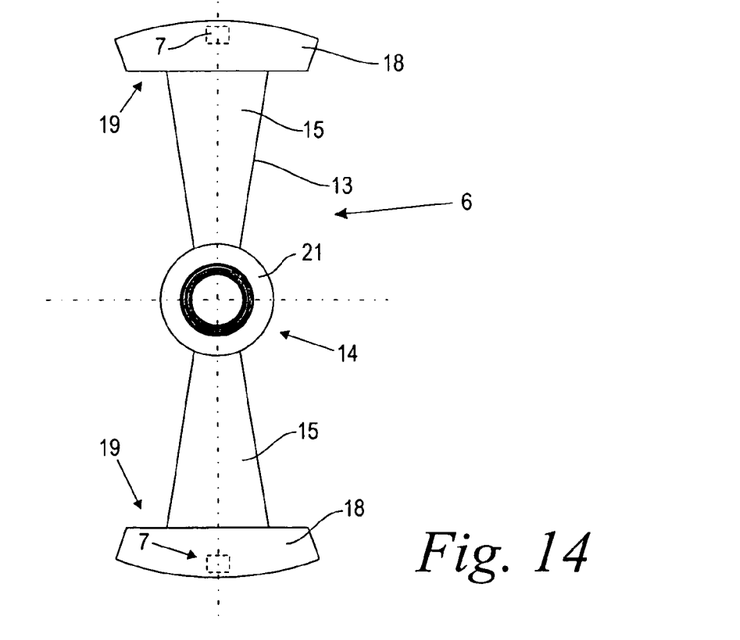

FIG. 14 shows another embodiment of a magnet carrier 6 wherein a number of arm sheet-metal parts 13 are centrally arranged in stacking direction. Hub annular discs 21 are arranged in stacking direction on both sides of the arm plates 13 in the region of the hub section 14. Sheet-metal pieces 18 of FIG. 5 are provided to lie radially outwardly. These sheet metal pieces are stacked on both sides to be contour flush to the hammerhead-shaped pole sections 19. The sheet-metal pieces 18 are concentrated in the region of the magnet holders 7 referred to their mass.

It is understood that the foregoing description is that of the preferred embodiments of the invention and that various changes and modifications may be made thereto without departing from the spirit and scope of the invention as defined in the appended claims.

What is claimed is:

1. A magnet wheel of an internal combustion engine including a drive motor for a portable handheld work apparatus, the engine having a shaft and said magnet wheel having a periphery, and said magnet wheel comprising:

a hub for mounting said magnet wheel on said shaft;

a magnet carrier having at least one magnet holder provided at said periphery of said magnet wheel;

said magnet carrier being configured as a packet of layered lamellar sheet-metal pieces;

said packet being of a modular configuration and layered from at least two differently shaped profiled sheet-metal piece types;

a first one of said profiled sheet-metal piece types being configured as an arm sheet-metal piece having a hub section defining a portion of said hub and an arm section extending radially outwardly from said hub section up to the region of said magnet carrier; and, a second one of said profiled sheet-metal piece types being configured as a rotating mass sheet-metal piece lying essentially radially outside in the peripheral region of said magnet carrier.

2. The magnet wheel of claim 1, wherein said arm sheet-metal piece and said rotating mass sheet-metal piece are configured as a single piece so as to form a spoked-wheel sheet-metal piece.

3. The magnet wheel of claim 2, wherein said rotating mass sheet-metal piece is configured as an annular sheet-metal piece disposed concentrically to said hub and lying in the region of said magnet holder.

4. The magnet wheel of claim 1, wherein said rotating mass sheet-metal piece is configured as a sheet metal piece concentrated in the region of said magnet holder.

5. The magnet wheel of claim 1, wherein said arm sheet-metal piece has an arm section and a hammerhead-shaped pole section formed on said arm section radially outside of said arm section.

6. The magnet wheel of claim 1, wherein said rotating mass sheet-metal piece is configured as an annular sheet-metal piece and said arm sheet-metal piece and said annular sheet-metal piece are formed as a single piece to define a spoked-wheel sheet-metal piece.

7. The magnet wheel of claim 1, wherein said packet includes a third one of said profiled sheet-metal piece types in the form of an annular hub disc; and, said annular hub disc is at least one in number and is mounted radially inwardly as part of said hub.

8. The magnet wheel of claim 1, wherein said packet includes a plurality of conically-stepped hub openings for forming said hub.

9. The magnet wheel of claim 1, wherein at least a portion of said layered lamellar sheet-metal pieces each has at least one receptacle opening for defining said magnet holder.

10. The magnet wheel of claim 5, wherein said magnet wheel includes a plurality of said arm sheet-metal pieces and the arm section of each of said arm sheet-metal pieces is assigned a magnet holder.

11. The magnet wheel of claim 1, wherein a form material is cast about said magnet carrier.

12. The magnet wheel of claim 11, wherein an injection-molded plastic is selected as said form material.

13. The magnet wheel of claim 11, wherein said magnet wheel further comprises a fan wheel formed by said form material to supply a cooling air flow for said drive motor.

14. The magnet wheel of claim 1, wherein said work apparatus is a motor-driven chain saw.

* * * * *